United States Patent [19]

Zerbe

[11] 3,734,294
[45] May 22, 1973

[54] POLLUTANT RECOVERY SYSTEM
[76] Inventor: James J. Zerbe, 2323 5th Avenue, San Rafael, Calif.
[22] Filed: Jan. 15, 1971
[21] Appl. No.: 106,844

[52] U.S. Cl. ............................ 210/242, 210/DIG. 21
[51] Int. Cl. ............................................. E02b 15/04
[58] Field of Search ................. 210/40, 242, DIG. 21, 210/30, 33

[56] References Cited

UNITED STATES PATENTS

| 2,330,508 | 9/1943 | McColl | 210/242 |
|---|---|---|---|
| 3,581,899 | 6/1971 | Hunter | 210/242 |
| 3,561,738 | 2/1971 | Galeano | 210/242 X |
| 3,612,280 | 10/1971 | Fitzgerald | 210/242 |
| 3,608,727 | 9/1971 | Grutsch et al. | 210/242 |
| 3,536,615 | 10/1970 | Bunn | 210/40 X |
| 3,561,601 | 2/1971 | McNeely | 210/242 |
| 3,615,017 | 10/1971 | Valdespino | 210/242 |

Primary Examiner—Samih N. Zaharna
Assistant Examiner—Thomas G. Wyse
Attorney—Fitch, Even, Tabin & Luedeka

[57] ABSTRACT

A system is described for removing a pollutant from the surface of water wherein the pollutant is confined to a recovery area and is directed to a recovery station by a plurality of linked booms. A particulate, floatable sorbent material is continuously distributed over the pollutant confined in the recovery area as it moves to the recovery station. The sorbent material is distributed in sufficient quantity to adsorb substantially all of the pollutant prior to its arrival at the recovery station. At the recovery station, recovery means are employed for removing the sorbent material and the adsorbed pollutant from the water surface.

10 Claims, 6 Drawing Figures

Patented May 22, 1973

INVENTOR.
JAMES J. ZERBE
BY Fitch, Even, Tabin
& Luedeka
ATTORNEYS

Patented May 22, 1973

INVENTOR.
JAMES J. ZERBE

BY

ATTORNEYS

POLLUTANT RECOVERY SYSTEM

This invention relates to the removal of a pollutant from the surface of water and, more particularly, to a system for removing pollutant from the surface of water and to recovery apparatus for use therein.

The potential ecological damage from massive ocean surface pollution has increased in proportion to the increasing use and size of tankers and development of undersea oil fields. Although some petroleum products may be effectively removed from the ocean's surface by burning, others, particularly crude oil, are not easily ignited. Detergents and other dispersal agents can have as serious ecological consequences when used extensively to clean up surface pollutants as the pollutants themselves. Coagulant chemicals for causing the surface pollutant to coagulate and sink may also be unsatisfactory due to the adverse ecological effects on sea bottom life from extensive coating of undersea surfaces.

Although apparatus has been designed for removing surface pollutants, such apparatus has not been readily adaptable to operation in a recovery system of the scale necessary to handle the extensive surface pollution resulting from off-shore oil well blow-outs or marine disasters. In addition, such apparatus has not been readily capable of handling the widely varying conditions which may prevail in the vicinity of widespread ocean surface pollution.

In designing an overall system for recovering ocean surface pollutants, sufficient flexibility should be built into the system to take into account the above mentioned variations in conditions. Thus, a satisfactory pollutant removal system is preferably capable of handling variations in the depth and area of the pollutant, wind direction and velocity, wave height and frequency, and tides and/or surface currents, the latter particularly in estuaries and other confined places.

Not only must the overall pollutant removal system be capable of operating under the above variations in conditions, but the particular apparatus utilized for the recovery of the pollutant must also be capable of operating subject to the above variations. Moreover, the recovery apparatus itself must be capable of picking up for storing, on a continuous basis, large quantities of the surface pollutant. Furthermore, recovery should be at a rate which is sufficiently fast as to be capable of exceeding the rate at which the pollutant is replenished, particularly in the case of an off-shore oil well blow-out.

In order to confine the surface pollutant to a recovery area and thus facilitate recovery of the pollutant by the recovery apparatus, the pollutant removal system may employ a linkage of floats or booms surrounding the pollutant. The use of floats or booms for this purpose is well known in the art. Nevertheless, the development of a satisfactory pollutant removal system also necessitates the use of a containment system capable of operating under the above mentioned variations in conditions without allowing the confined pollutant to escape from the recovery area. Escape of pollutant may occur by the pollutant passing over the top of the floats or booms due to inadequate response of the booms or floats to wave or wind action. Under some conditions, particularly surface current or high winds, the surface pollutant may flow underneath the floats or booms and such an occurrence, of course, should be prevented for satisfactory system operation. Finally, the design of a containment apparatus for use in a pollutant removal system of necessity must deal with such problems as undue rotation of the booms or floats, corrosion of the various parts including the connecting members thereof, and jackknifing of the linked booms or floats.

Accordingly, it is an object of the present invention to provide an improved system for removing a pollutant from the surface of water.

Another object of the invention is to provide an improved pollutant removal system capable of taking into account variations in the size of the pollutant spill, the direction and velocity of the wind in the area, the wave action, and tides or surface currents.

A further object of the invention is to provide improved pollutant recovery apparatus for use in the above system.

Other objects of the invention will become apparent to those skilled in the art from the following description taken in connection with the accompanying drawings wherein.

Figure 1:
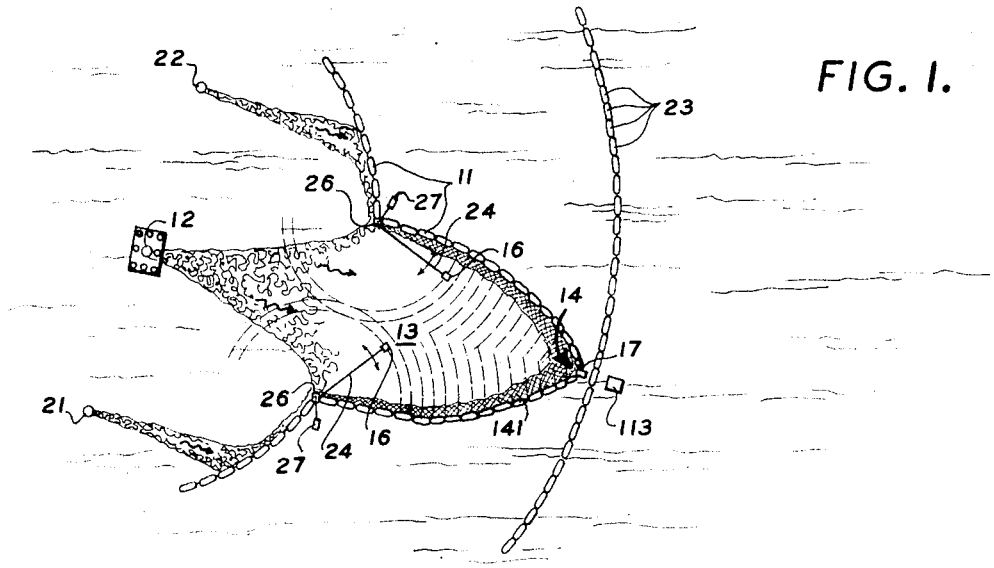
FIG. 1 is a plan view illustrating the use of a recovery system constructed in accordance with the invention.

Very generally, the system of the invention comprises a plurality of linked booms 11 for positioning downwind or down-current from a pollutant source 12 (or 21 or 22) to confine the pollutant to a recovery area 13 and to direct the pollutant to a recovery station 14. Distributing means 16 are provided for continuously distributing a particulate, floatable, sorbent material over the pollutant confined in the recovery area as it moves toward the recovery station. The particulate sorbent material is distributed in sufficient quantity to adsorb substantially all of the pollutant prior to its arrival at the recovery station. Recovery means 17 are provided at the recovery station for continuously removing the sorbent material and the adsorbed pollutant from the water surface.

Referring now more particularly to FIG. 1, the system of the invention is illustrated in connection with an off-shore drilling structure 12 for an oil well or oil wells. The drilling structure constitutes the source of pollutant such as would occur in the event of a defective well or well blow-out. Several other sources 21 and 22 of pollutant in the vicinity of the platform 12 are also shown. Overall containment of the oil spill or surface pollutant is provided by a surrounding barrier consisting of a plurality of linked booms 23 secured and anchored in any suitable manner. Preferably, the booms 23 are secured and anchored as shown and described in my copending application Ser. No. 57,121.

In the even of an oil well blow-out or other leak in the vicinity of the drill structure 12, the surface of the ocean in such vicinity will become covered with oil. Depending upon wind, current, or both, the oil will move in a direction away from the source and gradually spread out. This is indicated in the plan view of FIG. 1.

The linked booms 11 are arranged to contain the oil within the recovery area 13 and to direct it to the recovery station 14. In the illustrated system, this is accomplished by arranging the booms in a semicircular arrangement suitably anchored at the outermost ends, not shown, beyond the farther outer limits of the oil spill or spills such as beyond the path of the oil emanating from the sources 21 and 22. Because of the curvature of the booms, the oil from the sources 21 and 22 is confined and directed toward the recovery area 13 and merges with the oil from the platform 12. The semicircular portion of the boom arrangement 11 is open towards the recovery area and the booms are redirected by suitable anchoring, not shown, to funnel the oil in the recovery area towards the recovery station 14. Although the particular arrangement illustrated in FIG. 1 provides a satisfactory means of accomplishing the confinement and directing of the surface pollutant, other boom arrangements may be used consistent with the invention.

Deployment of the systems of booms illustrated in FIG. 1 down-wind or down-stream may be accomplished prior to the actual occurrence of a polluting situation. Thus, protective arrangements of booms may be placed around drilling areas with the placement of the anchors, sinker blocks and anchorage chain or cable, and buoy floats occurring prior to any oil spill. The boom units may be assembled from barges on site or may be assembled in shore and towed to the site of their placement.

It is known that floatable, particulate, sorbent material may be spread upon oil or other pollutant to expedite recovery of the pollutant from the surface of water. For example, granulated or ground polyurethane applied to an oil slick is capable of picking up the oil at a ratio of 28 pounds to 1 in 2 hours. The polyurethane used in such tests was not saturated and no oil was remaining on the water after removal of the sorbent. The properties of various types of sorbent material on various types of test oils are set forth on page 43 of the July 1970 issue of Ocean Industry.

In the system of the invention, pollutant in the recovery area is seeded with a particulate, floatable sorbent material, such as granulated or ground polyurethane. The seeding is such that the sorbent material is distributed over the entire surface of the pollutant in the recovery area so that all the pollutant passing therethrough on its way to the recovery station 14 comes in contact with the sorbent material. The amount of sorbent material distributed is such as to be greater than the amount at which saturation would take place. Thus, there is an overabundance of sorbent material present in the recovery area after seeding to insure that no oil or pollutant remains after the pick-up operation described subsequently.

The means 16 for distributing the sorbent material comprise seeder units deployed at the ends of tethers 24. Two seeder units 16 and two tethers 24 are illustrated. The details of the seeder units are described subsequently. A pivot platform 26 is provided at the corner between the funnel section of the booms 11 and the semicircular sections thereof. Each pivot platform is anchored on four sides for stable positioning and the tethers 24 are attached thereto. A supply or tender barge 27 is anchored near each of the pivot platforms for supplying sorbent material to the distributing means through flexible ducts as will be described.

The seeder units 16 have provision for causing widespread distribution of the sorbent material over the recovery area. The sorbent is supplied to the seeder units entrained in a supply of air through suitable ducting, and means are provided for propelling the seeder units 16 reciprocally about an arcuate path at the ends of their tethers 24.

Figure 2:
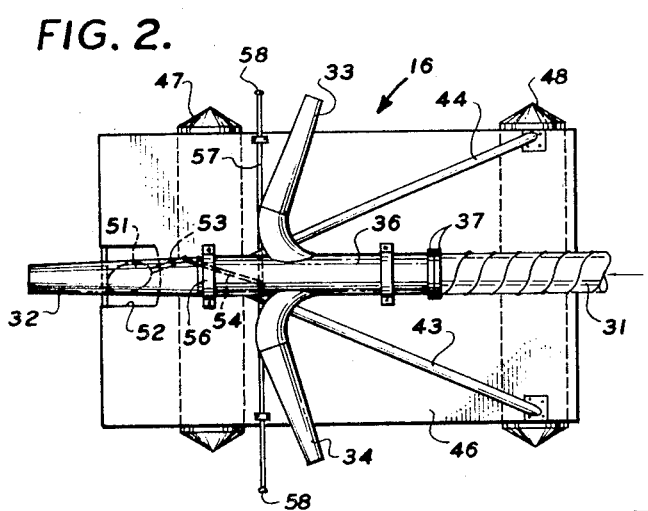
FIG. 2 is a plan view of apparatus used in the system of FIG. 1.
Figure 3:
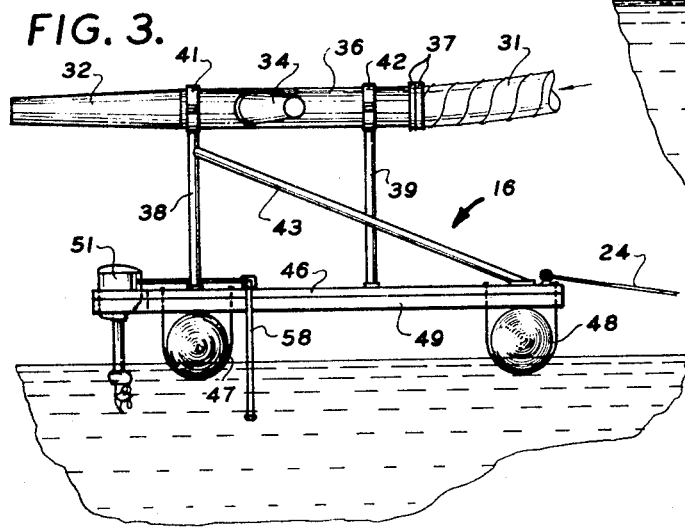
FIG. 3 is a side view of the apparatus illustrated in FIG. 2.

Referring now more particularly to FIGS. 2 and 3, a seeder unit is illustrated in detail. A flexible duct 31 connects the seeder unit with the pivot platform 26, as will be explained, and provides a supply of pressurized air with entrained sorbent material to the seeder unit. The sorbent material is then sprayed out through a front nozzle 32 and two side nozzles 33 and 34. The side nozzles 33 and 34 are angled away from the front nozzle at about 120°. The nozzles emanate from a common manifold 36 to which the flexible duct 31 is attached by suitable mounting flanges 37. The nozzles extend from the tube 36 substantially horizontally and the tube 36 is supported in a horizontal position by a pair of vertical supports 38 and 39 with mounting clamps 41 and 42 at their upper ends. A pair of support struts 43 and 44 angle outwardly from the vertical support 38 to provide rigidity to the mounting arrangement. The ends of the struts 43 and 44 are bolted to the upper surface of a horizontal platform or deck 46.

The horizontal platform 46, which provides the base for the seeder unit is floated on a pair of pontoons 47 and 48 suitably secured to the underside of the platform 46 beneath a pair of horizontal crossbeams 49, only one of which is visible. Positioning of the pontoons and mounting of the nozzles are arranged so as to provide stability to the unit as it floats in the water. The arrangement of the nozzles enables a wide swath or coverage of sorbent material for each reciprocation of the unit in its arcuate path.

In order to propel the seeder unit 16, each seeder unit is provided with an outboard motor 51 mounted at one end of the platform 46 in a motor well 52 formed therein. The outboard motor 51 is oriented to provide tension on the tether 24 at all times such that the seeder unit will move in an arcuate path at the very end of the tether with a center at the pivot platform 26. Automatic cyclcing is provided by a suitable mechanical reversing linkage comprising links 53 and 54, an over center toggle device 56, and a trip bar 57. The over center toggle device 56 may comprise a suitable cam and coil spring to provide a snap action to reverse the linkage from the position shown to the opposite side and thereby change the direction of the outboard motor 51. The trip bar 57 includes a pair of downwardly extending sections 58 on each side which are tripped by the booms as the device reaches the extremities of its arcuate travel. This changes the direction of the outboard motor and starts the seeder unit in the opposite direction in its arcuate path.

Figure 4:
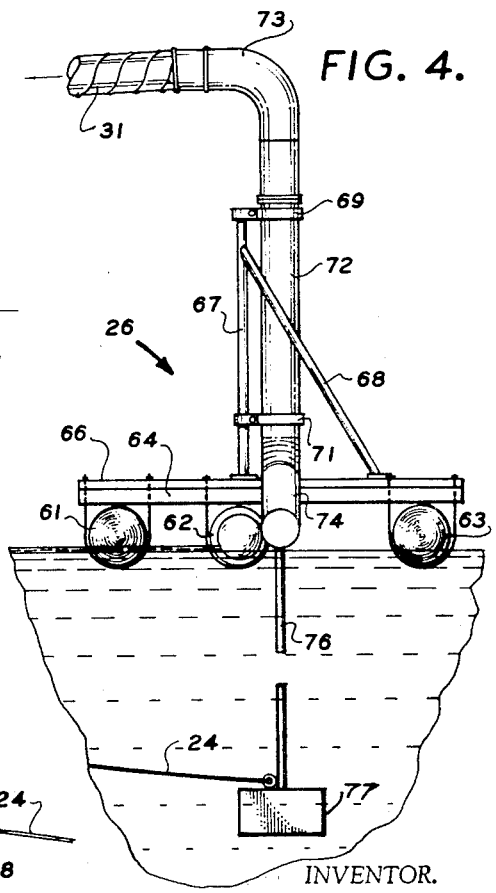
FIG. 4 is an end view of the apparatus illustrated in FIG. 2.

Turning now to FIG. 4, the pivot platform 26 is illustrated in a side elevation. The pivot platform 26 is floated on three pontoons 61, 62 and 63 extending transversely between a plurality of crossbeams 64. A deck 66 is laid across the crossbeams 64. A vertical strut 67 extends upwardly from the deck supported by a pair of angular struts 68, only one of which is visible, extending from near the top of the vertical struts 67 back down to the deck. A bracket 69 at the upper end of the strut 67 and a bracket 71 near the lower end of the vertical strut 67 secures a tube 72 in a vertical position. The tube 72 has an upper swivel elbow 73 which is attached to the opposite end of the duct 31 from the end of the duct attached to the corresponding seeder unit 16. The duct 31 is flexible and allows the seeder unit to move in its arcuate path with respect to the pivot platform 26 while maintaining communication therewith to transfer air entrained sorbent material to the seeder unit. The lower end of the tube 72 contains another elbow section 74 which extends at an angle from the bracket 71 downwardly to extend outward of the platform 26. The lower end of the elbow 74 is attached by a flexible duct, not shown, similar to the duct 31 to a support tender 27 which supplies pressurized air and sorbent material. The air entrained sorbent material is then transferred through the elbow 74 through the tube 72 and the elbow 73 through the duct 31, the manifold 36 and then issues forth from the nozzles 32, 33 and 43 to be distributed over the pollutant.

In order to stabilize the pivot platform 26, a suitable anchorage is employed, not shown. Preferably, the anchorage is a four-way anchorage to maintain the pivot platform in a fixed position relative to the source of the pollutant. For stability, a beam 76 extends downwardly from the pivot platform and a counterweight 77 is supported on the end of the beam 76. The cable 24 is secured to the upper surface of the counterweight 77 by suitable means, not shown.

Figure 5:
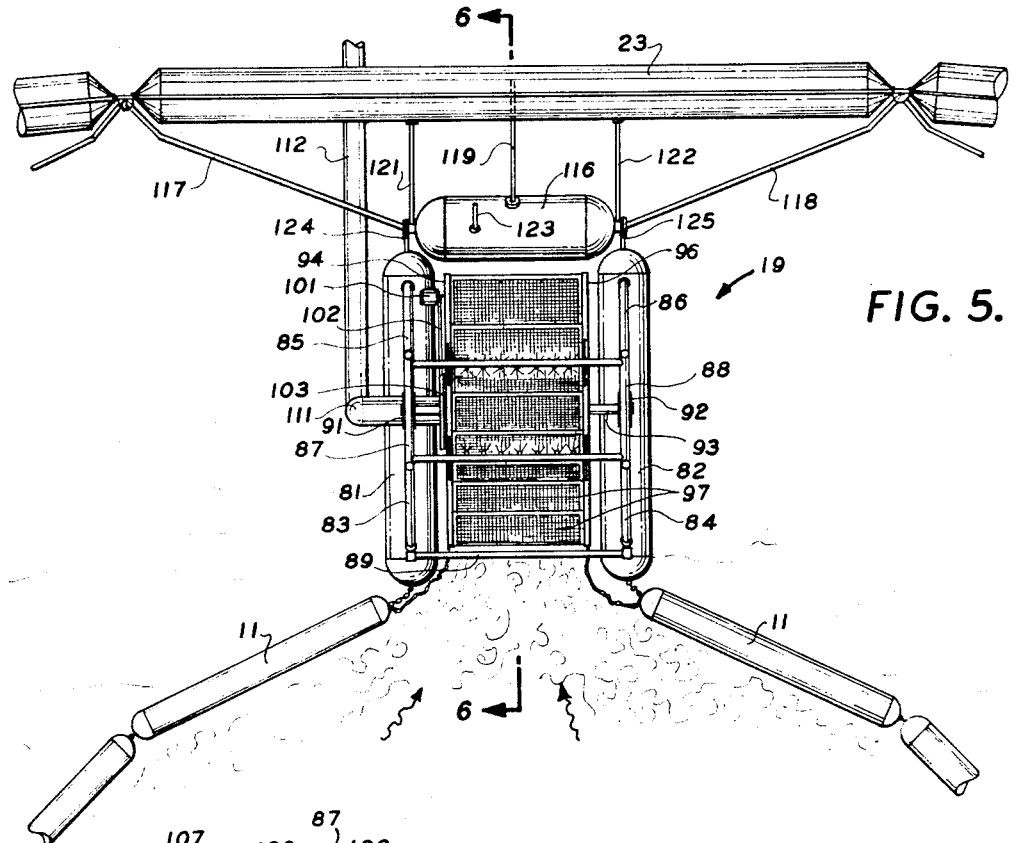
FIG. 5 is a plan view of further apparatus used in the system of the invention.
Figure 6:
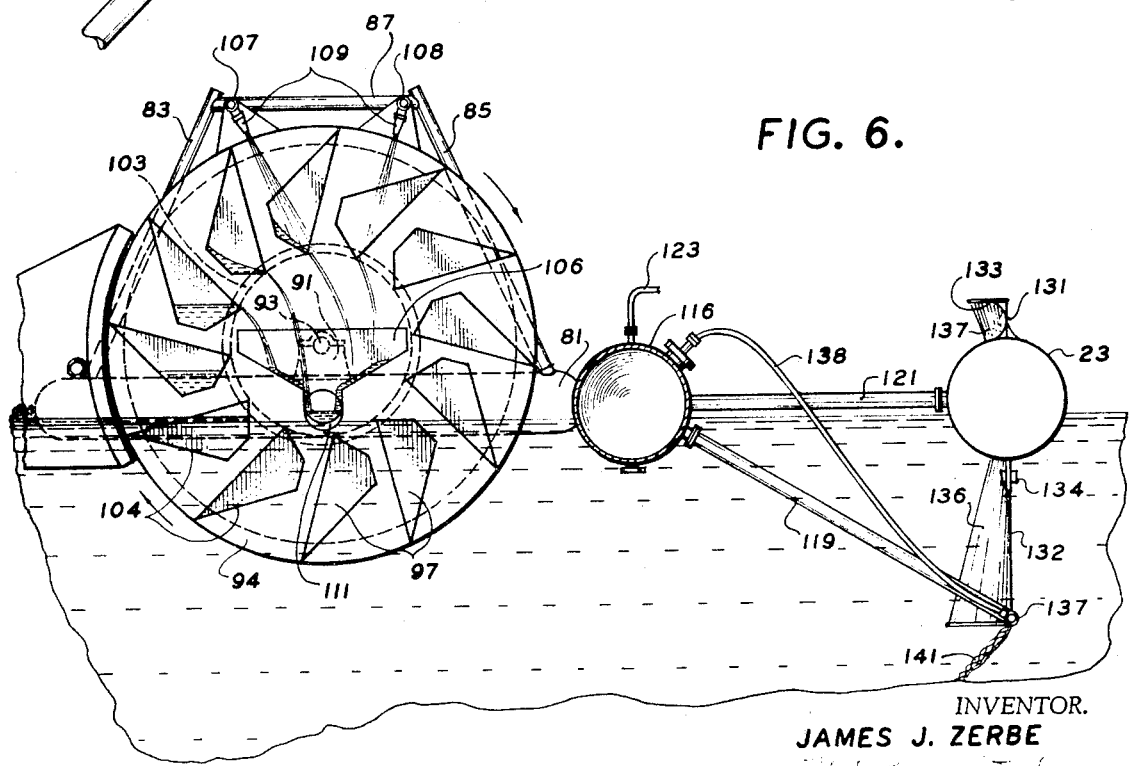
FIG. 6 is a sectional view taken along the line 6—6 of FIG. 5.

In FIGS. 5 and 6, the recovery device 17 is shown in detail. The recovery device 17 comprises a pair of pontoons 81 and 82 arranged parallel with each other and supporting a frame. The frame is comprised of a pair of forward struts 83 and 84 on the pontoons 81 and 82, respectively, which extend upwardly from the pontoons and are angled slightly backward towards the rear of the device. A similar pair of upright struts 85 and 86 extend from the pontoons 81 and 82, respectively, and extend at an angle forwardly. The upper ends of the struts 83 and 85 are connected by a cross bar 87 and the upper ends of the struts 84 and 86 are connected by a horizontal crossbar 88. The lower ends of the struts 83 and 84 adjacent the pontoons 81 and 82, respectively, are connected by a horizontal reinforcing bar 89. The forward ends of the pontoons 81 and 82 are chained to the ends of the funnel section booms 11. Suitable means, not shown, are provided between the ends of the booms 11 and the ends of the pontoons 81 and 82 to prevent leakage of pollutant.

Upright flanges 91 and 92 are mounted on the top of the pontoons 81 and 82, respectively. A stub shaft 93 extends from each of the flanges 91 and 92 and the stub shafts support, by suitable bearings not shown, a pair of support discs 94 and 96 spaced from and parallel with each other. A series of troughs or buckets are mounted between the discs 94 and 96 and are distributed circumferentially about the discs. As may be seen in FIG. 6, the troughs are shaped in a manner of scoops with their outer lips extending radially outward of the discs 94 and 96.

Drive for the rotary arrangement of the troughs 97 and the supporting discs 94 and 96 is provided by a suitable drive motor 101 and a drive chain 102 and drive sprocket 103, coupled to the disc 94. Rotation of the apparatus is in the direction of arrows in FIG. 6, i.e., clockwise, so that the scoops move with their open sides coming up underneath the mat of sorbent and adsorbed pollutant. The bottom surfaces 104 of the troughs are porous such as with a galvanized screen enabling the less viscous water captured in the troughs to quickly escape as the troughs move upwardly, but preventing the sorbent-pollutant combination from passing out of the troughs.

As may be seen in FIG. 6, the troughs move upwardly and, since they are rigidly attached to the discs 94 and 96, begin to tip, discharging their contents. A collection tray 106 is positioned between the inner ends of the stub shafts 93 at a position to receive the contents of the troughs as they discharge when they are tipped upright by the rotation of the apparatus. This is illustrated in FIG. 6. In order to facilitate discharge of the contents of the troughs into the collection tray 106, a pair of conduits 107 and 108 are provided extending between the crossbeams 87 and 88. The conduits are equipped with a plurality of nozzles 109 spaced along their length and pointing downwardly. Suitable means, not shown, supplies hot water or possibly a detergent mixture to the conduits 107 and 108 to be discharged through the nozzles 109. The nozzles are aimed at the troughs in order to facilitate the release of the contents thereof. Due to the porosity of the bottoms 104 of the troughs, the spray liquid, under pressure, can pass into the interior of the troughs and easily discharge their contents into the collection tray 106.

The collection tray 106 is provided with a discharge orifice 111 at one end thereof. The discharge orifice passes through an opening in the disc 94 and is connected through a suitable flexible conduit 112 to a pump in a support tender 113 (see FIG. 1). The support tender is equipped with suitable pumping capacity to withdraw the contents of the collection tray 106 and thus effect continuous removal of the pollutant.

In the illustrated embodiment, the recovery apparatus 17 is shown used in connection with a retention system as shown and described in the aforesaid copending application. As may be seen in FIG. 6, one of the booms 23 in the outer ring of booms seen in FIG. 1 is provided with a high pressure vessel 116 mounted in outrigger fashion on the pollutant side of the boom. The high pressure vessel is for supplying compressed air to an air release system, not shown, used in conjunction with the boom. The system is described more fully in the aforementioned copending application. The high pressure vessel 116 is connected to the ends of the boom by a pair of outer struts 117 and 118 and by a central strut 119. Braces 121 and 122 extend from the boom 23 to the juncture between the tank 116 and the struts 117 and 118. The tank is pressurized through a line 123 from the support tender 113 (FIG. 1). Air from the tank 116 is used to assist in preventing flow of pollutant under the boom 23, as described in detail in the aforesaid copending application. The pontoons 81 and 82 are attached to the juncture between the struts 117 and 118 and the tank 116 by pivotal hinges 124 and 125, respectively.

The detailed construction of the booms 23 are described in the aforesaid copending application and will not be discussed in detail herein. In order to increase the surface area and provide a barrier offering resistance to escape of the oil or pollutant from the recovery area, the booms 23 are each provided with an upper fin 131 and a lower steel plate keel 132. The fin 131 of reinforced polystyrene is chemically bonded or welded to the skin of the boom 23 and is formed with a splash guard 133 to prevent splashing of the pollutant over the boom. The keel 132 is bolted to a flange 134 which depends from the underside of the boom 23. The spaces between the booms are arranged to prevent the passage of oil therebetween by provision of a pair of flexible neoprene skirts 136 and 137 as described in greater detail in the aforesaid copending application. The lower edge of the keel 132 is provided with a conduit 137 to which a line 138 is connected from the pressurized tank 116. Air under pressure is supplied to the conduit 137 and is released in a manner to prevent flow of oil under the keel as described in the aforesaid copending application.

To insure that the sorbent-pollutant mat will not escape beneath the auxiliary boom, a small meshed fabric net 141 (½ inch mesh for example) is attached to the keel of the boom segments as shown in FIG. 1. The bottom of the net consists of a tube in which a cable or nylon line is threaded with ends terminating at the two pivot platforms shown in FIG. 1. By attaching the mid portion of the tube at the bottom of the net to the recovery device 17, the ends may be tensioned so that drawstring action shrinks the base of the net and prevents any sorbent material from escaping underneath the booms by undertow. The net is sufficiently porous as to allow full flow of current without restriction.

It may therefore be seen that the present invention provides an improved system for removing pollutant from the surface of water and improved recovery apparatus for use therein. The system is capable of handling large amounts of surface pollutant and of recovering it very quickly. The system is economical and is adaptable to a wide variety of conditions.

Various modifications of the invention shown and described herein will become apparent to those skilled in the art from the foregoing description and accompanying drawings. Such modifications are intended to fall within the scope of the appendant claims.

What is claimed is:

1. A system for removing a pollutant from the surface of water, comprising, a plurality of linked booms for positioning down-wind or down-current to confine the pollutant to a recovery area, said booms being arranged in a configuration which directs the pollutant to a recovery station, distributing means positioned a substantial distance from said recovery station for continuously distributing a particulate floatable sorbent material over the pollutant confined in the recovery area as it moves to the recovery station, said distributing means adapted to provide sorbent material in sufficient quantity to adsorb substantially all of the pollutant prior to its arrival at the recovery station, and recovery means at the recovery station for continuously removing the sorbent material and the adsorbed pollutant from the water surface, said recovering means including a rotatable support and a plurality of scoops mounted thereon, said scoops each having at least a part of a porosity to allow water to pass out of said scoops while retaining said sorbent material and adsorbed pollutant, and sorbent removal means for removing said sorbent material and adsorbed pollutant from said scoops.

2. A system according to claim 1 wherein said scoops are rigidly mounted to said support so that they tip at the top of the rotational path, and wherein said sorbent removal means include a collection tray positioned to receive the contents of said scoops as they tip.

3. A system according to claim 2 wherein said sorbent removal means further include means for spraying hot water on said scoops as they tip above said collection tray to facilitate discharge of the contents of said scoops.

4. A system according to claim 2 wherein means are provided for transferring material from said collection tray to a storage vessel.

5. A system according to claim 1 wherein said recovery means include a floatable base, and wherein said support is mounted on said floatable base.

6. A system according to claim 5 including hinged means coupling said floatable base to at least one of said linked booms.

7. A system according to claim 1 wherein said distributing means include at least one flexible duct having a discharge end, and means for supplying air entrained particulate, floatable, sorbent material to said duct to be discharged therefrom at the recovery area from said discharge end.

8. A system according to claim 7 wherein said distributing means include a floatable support for said discharge end for said flexible duct.

9. A system according to claim 8 wherein said distributing means include means for moving said floatable support repetitively to vary the direction in which entrained sorbent material is discharged from said duct.

10. A system according to claim 9 wherein said moving means include means comprising a tether for securing said floatable support to at least one of said linked booms, propelling means on said floatable support oriented to maintain tension in said tether, and means for varying the direction of said propelling means to cause said floatable support to reciprocate in its motion.

* * * * *